(12) United States Patent
Kuruma et al.

(10) Patent No.: US 11,888,175 B2
(45) Date of Patent: Jan. 30, 2024

(54) BATTERY PACK

(71) Applicant: TOYOTA JIDOSHA KABUSHIKI KAISHA, Toyota (JP)

(72) Inventors: Yusuke Kuruma, Toyota (JP); Shigeyuki Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/399,016

(22) Filed: Apr. 30, 2019

(65) Prior Publication Data

US 2019/0348654 A1 Nov. 14, 2019

(30) Foreign Application Priority Data

May 8, 2018 (JP) ................................ 2018-089896

(51) Int. Cl.
*H01M 50/342* (2021.01)
*H01M 50/271* (2021.01)
*H01M 50/209* (2021.01)

(52) U.S. Cl.
CPC ....... *H01M 50/342* (2021.01); *H01M 50/209* (2021.01); *H01M 50/271* (2021.01); *H01M 2220/20* (2013.01)

(58) Field of Classification Search
CPC . H01M 2/12–1235; H01M 2/10–1088; H01M 50/30–342; H01M 50/20; H01M 50/209; H01M 50/271; H01M 2220/20
See application file for complete search history.

(56) References Cited

U.S. PATENT DOCUMENTS

| 7,771,865 | B2* | 8/2010 | Takasaki | H01M 2/1083 429/83 |
| 2011/0177366 | A1* | 7/2011 | Nagasaki | H01M 10/659 429/83 |
| 2011/0262799 | A1* | 10/2011 | Kim | H01M 50/20 429/156 |
| 2013/0089763 | A1* | 4/2013 | Lee | H01M 2/1077 429/71 |
| 2013/0095355 | A1* | 4/2013 | Okutani | H01M 50/342 429/88 |
| 2015/0280193 | A1* | 10/2015 | Ohshiba | H01M 10/658 361/535 |
| 2016/0036022 | A1 | 2/2016 | Tononishi et al. | |
| 2018/0190954 | A1 | 7/2018 | Hashimoto et al. | |
| 2018/0358587 | A1 | 12/2018 | Tononishi | |

FOREIGN PATENT DOCUMENTS

| CN | 103035975 A | 4/2013 |
| CN | 207409556 U | 5/2018 |
| JP | 2010-108788 A | 5/2010 |
| JP | 2014-135247 A | 7/2014 |
| JP | 2016-033908 A | 3/2016 |
| WO | 2016/135785 A1 | 9/2016 |
| WO | 2017/047683 A1 | 3/2017 |

* cited by examiner

*Primary Examiner* — Cynthia H Kelly
*Assistant Examiner* — Niara Trant
(74) *Attorney, Agent, or Firm* — Sughrue Mion, PLLC

(57) ABSTRACT

Each cell forming a battery stack has a discharge valve configured to discharge gas in the inside to the outside when an internal pressure increases. A case houses the battery stack. A plate member is provided between each discharge valve and an upper case. The plate member is arranged to overlap with each discharge valve when the battery stack and the plate member are planarly viewed from above.

5 Claims, 6 Drawing Sheets

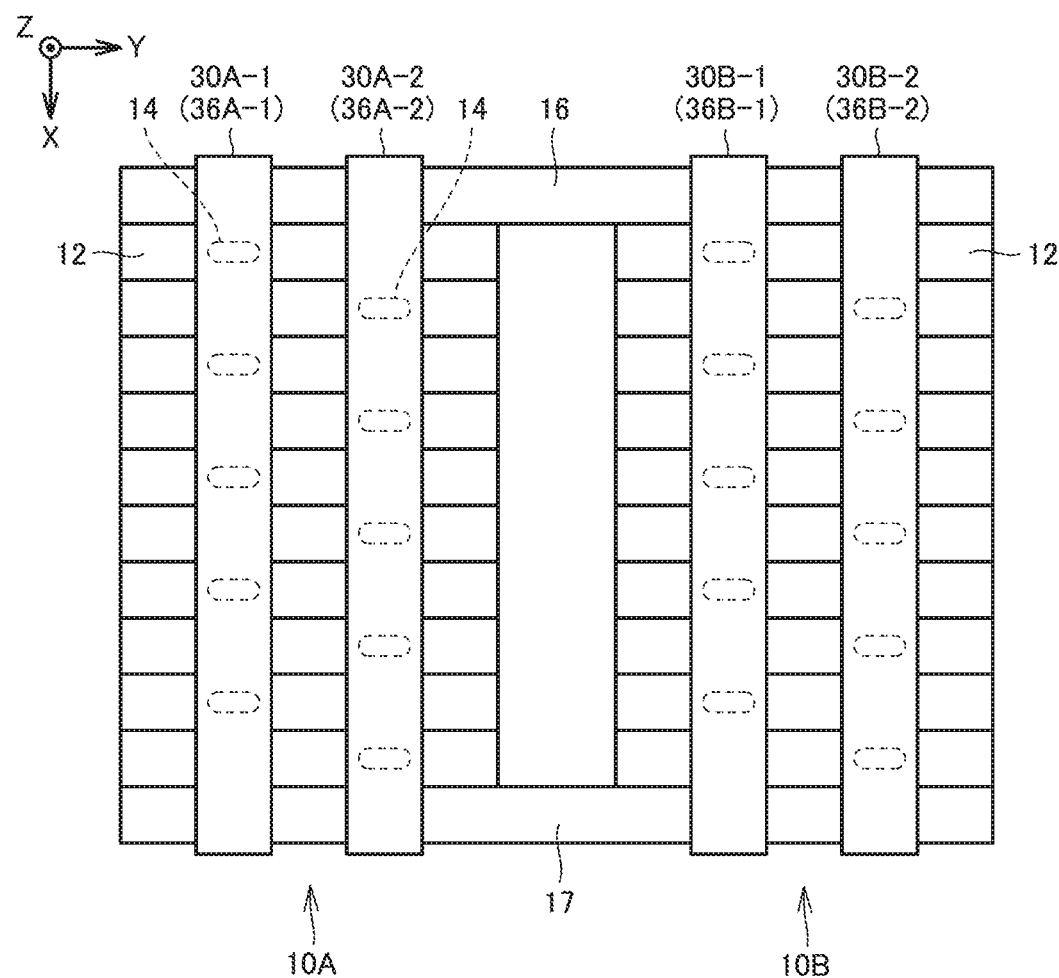

BATTERY PACK

This nonprovisional application is based on Japanese Patent Application No. 2018-089896 filed on May 8, 2018 with the Japan Patent Office, the entire contents of which are hereby incorporated by reference.

BACKGROUND

Field

The present disclosure relates to a battery pack, and particularly to a battery pack in which a battery having a discharge valve configured to discharge gas in the inside to the outside when an internal pressure increases is housed in a case.

Description of the Background Art

Japanese Patent Laying-Open No. 2010-108788 discloses a battery pack (battery system) in which a battery having a discharge valve as described above is housed in a case. This battery pack includes a battery stack (battery block) formed of a plurality of prismatic shape batteries each having a gas discharge valve, a case (outer case) configured to house the battery stack, and a discharge duct connected to the discharge valve of each battery. A cushioning member having numerous pores through which the gas can pass is provided in the discharge duct. This makes it possible to discharge the gas to the outside of the case through the discharge duct, while attenuating the energy of the gas discharged from the discharge valve.

When the high-temperature gas discharged vigorously from the discharge valve opened as a result of an increase in internal pressure of the battery hits the case directly, the case may be subjected to pressure locally and heated, and thus, the case may be damaged.

The battery pack described in Japanese Patent Laying-Open No. 2010-108788 includes the discharge duct in which the cushioning member is provided along a passage. However, a space for arranging the discharge duct is required between the discharge valve and the case, which leads to an increase in size of the battery pack.

SUMMARY

Accordingly, an object of the present disclosure is to, in a battery pack in which a battery having a discharge valve is housed in a case, prevent the case from being damaged by gas discharged from the opened discharge valve, while suppressing an increase in size of the battery pack.

A battery pack according to the present disclosure includes: at least one battery; a case; and a plate member. The battery includes a discharge valve configured to discharge gas in the inside to the outside when an internal pressure increases. The case is configured to house the battery. The plate member is provided between the discharge valve and the case. The plate member is arranged to overlap with the discharge valve when the battery and the plate member are planarly viewed from a direction normal to a surface of the battery provided with the discharge valve.

With such a configuration, the high-temperature gas discharged vigorously from the opened discharge valve hits the plate member provided between the discharge valve and the case and does not hit the case directly. In addition, the plate member does not require the placement space, unlike the discharge duct described in Japanese Patent Laying-Open No. 2010-108788. Therefore, according to the battery pack, it is possible to prevent the case from being damaged by the gas discharged from the opened discharge valve, while suppressing an increase in size of the battery pack.

The at least one battery may include a plurality of batteries (hereinafter referred to as "cells"). The plurality of cells may be provided and stacked to form a battery stack, and the plurality of cells may be stacked such that each of the plurality of cells is provided with the discharge valve on a first surface forming one surface of the battery stack. The plate member may extend in a stacking direction of the plurality of cells and may be continuously formed with respect to the discharge valve of each of the cells.

According to the battery pack, the plate member is continuously formed with respect to the discharge valves of the cells. Therefore, the number of components can be reduced as compared with when the plate member is separately prepared for each cell.

The plate member may be formed by a restraint band configured to restrain the battery stack from both sides in the stacking direction of the cells.

Thus, the restraint band having the function of restraining the battery stack can also have the function of preventing the gas discharged from the opened discharge valve from hitting the case directly. Therefore, it is unnecessary to provide the plate member separately from the restraint band, and thus, the number of components can be reduced.

The plate member may be attached to a second surface, the second surface facing the first surface of the battery stack and forming one surface of the case.

According to this configuration, the plate member can be easily placed between the discharge valve and the case. In addition, the plate member serves as a reinforcing member for the case, and thus, the strength of the case is also increased.

The case may include: a lower case in which the cell is disposed; and an upper case provided above the lower case, and the plate member may be provided between the discharge valve and the upper case. The upper case may be made of resin.

In the battery pack, the upper case is made of resin, and thus, the weight of the battery pack can be reduced. On the other hand, resin is generally inferior in heat resistance to metal and the like. According to the battery pack, the plate member is provided between the discharge valve and the upper case made of resin. Therefore, the upper case made of resin can be protected against the high-temperature gas discharged from the opened discharge valve.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 9 is a plan view showing an arrangement example of plate members or restraint bands.

DESCRIPTION OF THE PREFERRED EMBODIMENTS

Figure 1:
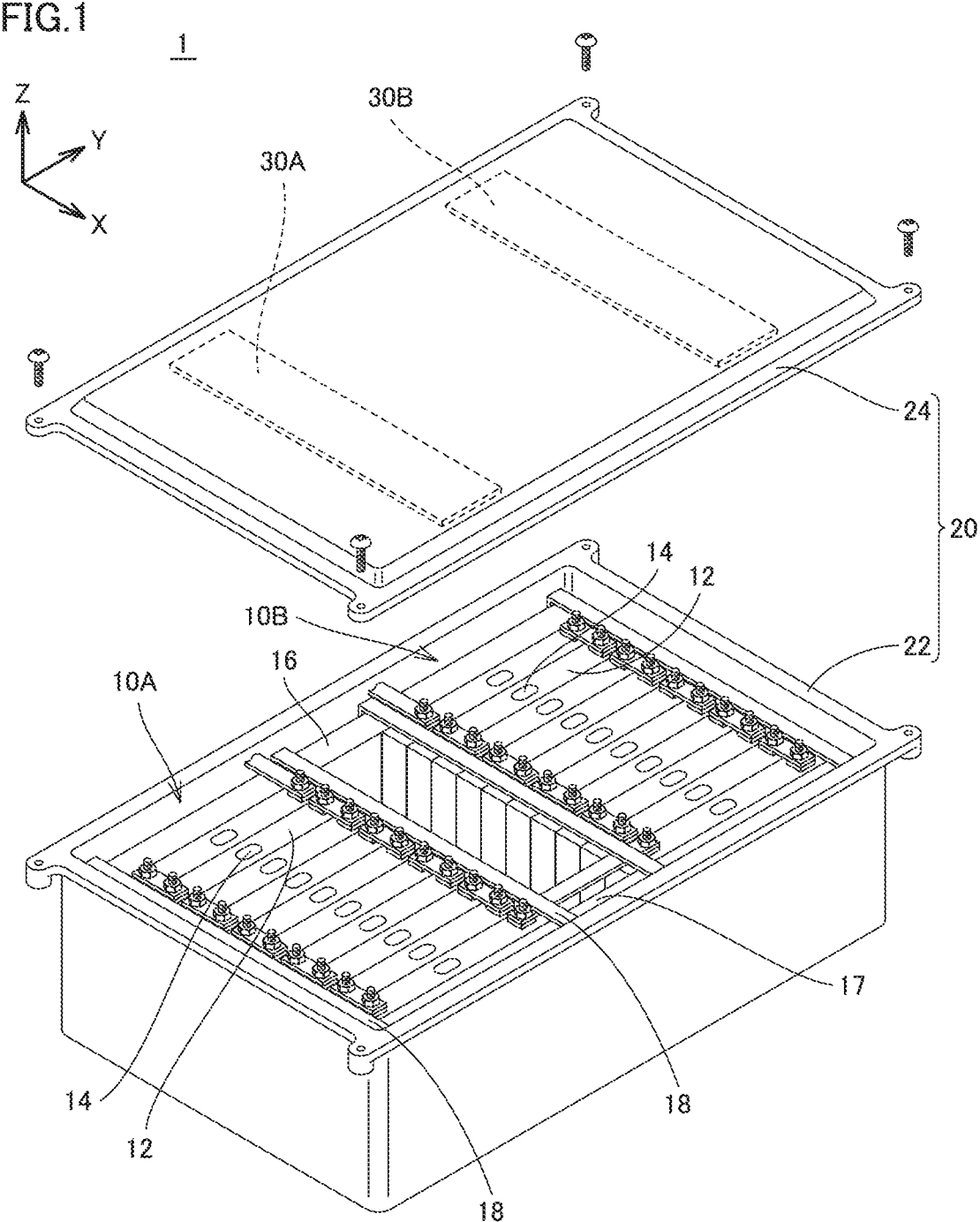
FIG. 1 is a perspective view of a battery pack according to a first embodiment.

Embodiments of the present disclosure will be described in detail hereinafter with reference to the drawings, in which the same or corresponding portions are denoted by the same reference characters and description thereof will not be repeated.

First Embodiment

A configuration of a battery pack according to a first embodiment of the present disclosure will be described hereinafter with reference to FIGS. 1 to 3. In the figures, an X direction represents a stacking direction of cells, and a Y direction represents a direction perpendicular to the X direction and along a bottom surface of the battery pack. A Z direction represents a direction perpendicular to the bottom surface of the battery pack and may be hereinafter referred to as "upwardly" and the like.

FIG. 1 is a perspective view of the battery pack according to the first embodiment. FIG. 1 shows the battery pack in a state where an upper case (described below) has been detached such that the inside (upper part) of the battery pack is visible.

Figure 2:
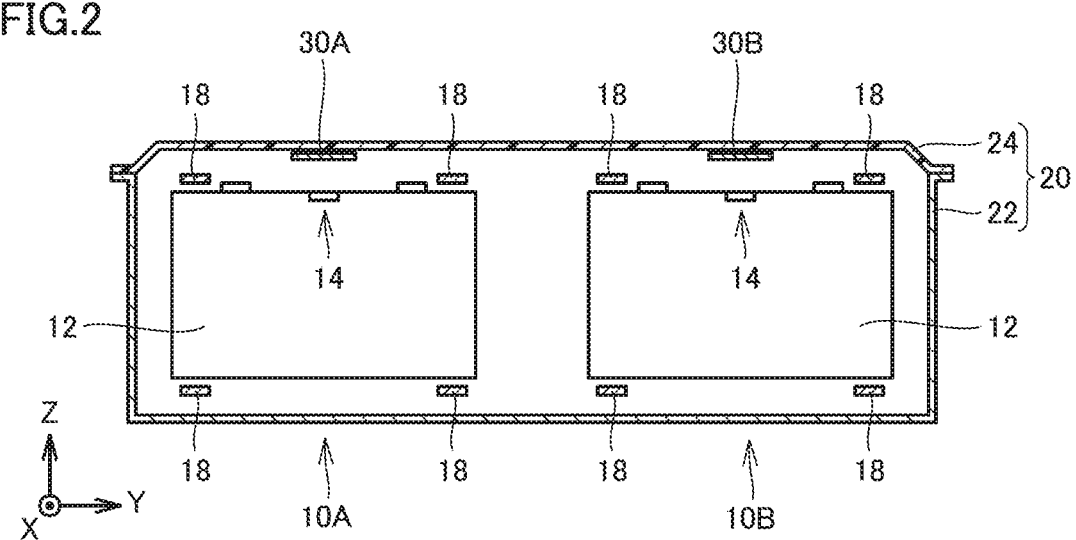
FIG. 2 is a cross-sectional view of the battery pack shown in FIG. 1.

FIG. 2 is a cross-sectional view of the battery pack shown in FIG. 1. FIG. 2 shows a cross section along a Y-Z plane. FIG. 2 also shows a cross section in a state where the upper case has been attached.

Figure 3:
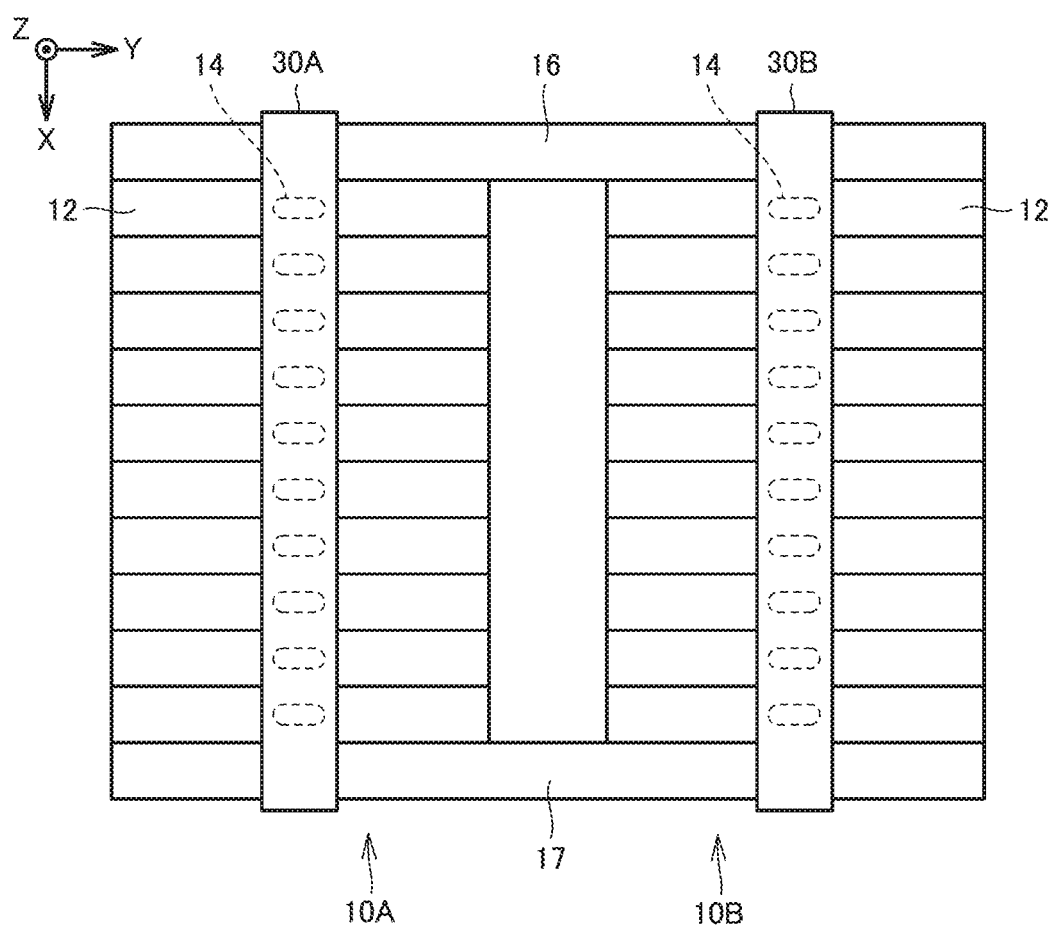
FIG. 3 is a plan view showing the positional relation between cells and plate members included in the battery pack shown in FIG. 1.

FIG. 3 is a plan view showing the positional relation between cells and plate members (described below) included in the battery pack shown in FIG. 1. FIG. 3 shows a plan view when the cells and the plate members are planarly viewed from above.

The battery pack described below is mounted on, for example, an electric powered vehicle such as an electric vehicle or a hybrid vehicle that can be driven by a motor, and is configured to include a battery that stores electric power supplied to the motor. However, the battery pack according to the present disclosure is not limited to the battery pack mounted on the electric powered vehicle, and may be used for other applications.

Referring to FIGS. 1 to 3, a battery pack 1 includes battery stacks 10A and 10B, a case 20, and plate members 30A and 30B. Each of battery stacks 10A and 10B includes a plurality of cells 12, end plates 16 and 17, and a plurality of restraint bands 18. Although battery pack 1 is configured to include two battery stacks 10A and 10B in this example, the battery pack according to the present disclosure is not limited thereto. The battery pack according to the present disclosure may be configured to include one battery stack or three or more battery stacks.

Cell 12 is a secondary battery and is typically a lithium ion secondary battery. The lithium ion secondary battery is a battery that includes lithium as an electric charge carrier, and may also include a so-called all-solid-state battery including a solid electrolyte, in addition to a common lithium ion secondary battery including a liquid electrolyte. Cell 12 is not limited to the lithium ion secondary battery and may be configured by a nickel-metal hydride secondary battery or another secondary battery.

A discharge valve 14 is provided at the center of an upper surface of a container (cell case) of cell 12. Discharge valve 14 is configured to be opened as a result of a break and the like of the member when the pressure in the cell case increases, and discharge gas in the cell case to the outside of the cell case. Each cell 12 has a substantially rectangular parallelepiped shape, and the plurality of cells 12 are stacked in the X direction to form each of battery stacks 10A and 10B.

End plates 16 and 17 are provided at one end and the other end of battery stacks 10A and 10B in the X direction, respectively, and are arranged to sandwich battery stacks 10A and 10B. Although end plates 16 and 17 are shared by battery stacks 10A and 10B in this example, the end plates may be formed for each of battery stacks 10A and 10B.

Restraint band 18 extends along the stacking direction (X direction) of cells 12 and connects end plates 16 and 17. In this first embodiment, on the upper surface side of each of battery stacks 10A and 10B, restraint bands 18 are arranged at both ends in the Y direction so as not to block discharge of the gas from discharge valves 14, and on the lower surface side of each of battery stacks 10A and 10B as well, restraint bands 18 are arranged at both ends in the Y direction. Restraint bands 18 restrain battery stacks 10A and 10B in the stacking direction of cells 12 by applying a restraint load in the stacking direction of cells 12.

Case 20 includes a lower case 22 and an upper case 24. Lower case 22 is formed by a bottom plate and a peripheral wall portion extending upwardly along a perimeter of the bottom plate, and is provided with an opening that is open upwardly. Battery stacks 10A and 10B are disposed in lower case 22. Lower case 22 is made of, for example, metal.

Upper case 24 is attached to lower case 22 so as to close the opening of lower case 22. In this example, upper case 24 is made of resin, and thus, the weight of battery pack 1 is reduced. Plate members 30A and 30B are provided on the case inner surface side of upper case 24.

Plate members 30A and 30B are provided between battery stacks 10A, 10B and upper case 24, respectively, and extend in the stacking direction of cells 12. Each of plate members 30A and 30B is formed by a thin plate having a substantially rectangular cross-sectional shape along the Y-Z plane (FIG. 2). When plate members 30A and 30B and battery stacks 10A and 10B are planarly viewed from above (FIG. 3), plate member 30A is arranged to overlap with discharge valves 14 of cells 12 forming battery stack 10A, and plate member 30B is arranged to overlap with discharge valves 14 of cells 12 forming battery stack 10B.

Plate members 30A and 30B are spaced apart from discharge valves 14 so as not to block discharge of the gas from opened discharge valves 14. In this first embodiment, plate members 30A and 30B are attached to the case inner surface side of upper case 24 by not-shown several fixtures such as bolts.

Plate members 30A and 30B are provided to prevent the high-temperature gas discharged vigorously from opened discharge valves 14 from directly hitting upper case 24 provided above discharge valves 14. Therefore, plate members 30A and 30B are made of a material having such strength and heat resistance that plate members 30A and 30B are not damaged when the high-temperature gas discharged from discharge valves 14 hits plate members 30A and 30B directly. Plate members 30A and 30B are made of, for example, metal and the like.

When the internal pressure of the cell increases and discharge valve 14 operates, the high-temperature gas is discharged vigorously from discharge valve 14. When such gas hits upper case 24 directly, upper case 24 may be subjected to pressure locally and heated, and thus, upper case 24 may be damaged. Particularly, in this first embodiment, upper case 24 is made of resin, and thus, upper case 24 may be damaged.

In battery pack 1 according to this first embodiment, when discharge valve 14 operates, the high-temperature gas discharged vigorously from opened discharge valve 14 hits plate member 30A or 30B provided between discharge valve 14 and upper case 24 and does not hit upper case 24 directly. As a result, a local increase in pressure of upper case 24 caused by the gas discharged vigorously from discharge valve 14 is suppressed and a local increase in temperature of upper case 24 caused by that high-temperature gas is suppressed, and a reduction in strength of upper case 24 caused by heat is suppressed.

Figure 4:
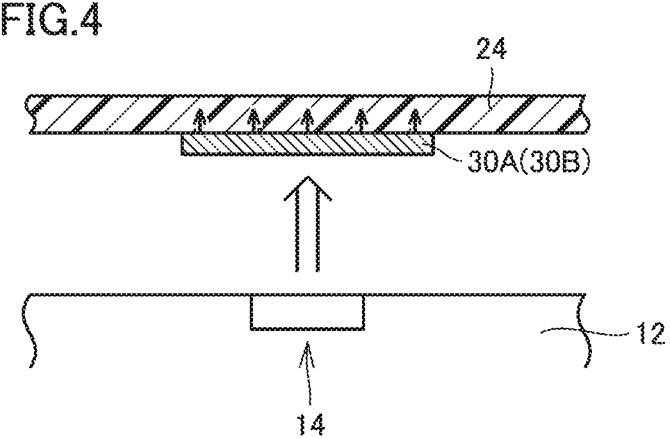
FIG. 4 shows the pressure produced by gas discharged from a discharge valve of a cell.

FIG. 4 shows the pressure produced by the gas discharged from discharge valve 14 of cell 12. FIG. 4 shows an enlarged view of the surroundings of discharge valve 14 and plate member 30A (30B) in the cross-sectional view shown in FIG. 2.

Referring to FIG. 4, the gas discharged vigorously from opened discharge valve 14 hits plate member 30A (30B) attached to upper case 24. Since plate member 30A (30B) is attached to upper case 24 so as to have a certain area, the pressure received by upper case 24 is distributed and a local increase in pressure in upper case 24 is suppressed.

Figure 5:
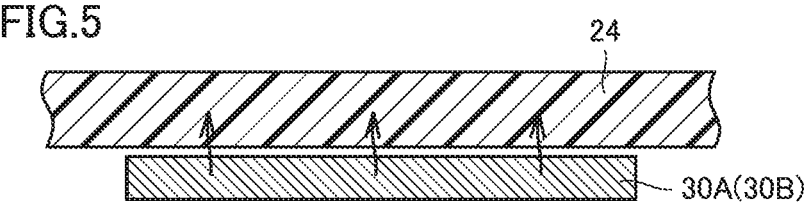
FIG. 5 is a diagram for illustrating a flow of heat produced by the gas discharged from the discharge valve of the cell.

FIG. 5 is a diagram for illustrating a flow of heat produced by the gas discharged from discharge valve 14 of cell 12. FIG. 5 shows an enlarged view of the surroundings of plate member 30A (30B) in the cross-sectional view shown in FIG. 2.

Referring to FIG. 5, the high-temperature gas discharged from opened discharge valve 14 hits plate member 30A (30B). Plate member 30A (30B) that receives heat from the high-temperature gas is attached to upper case 24. However, a very small gap between plate member 30A (30B) and upper case 24 caused by very small asperities on a contact surface of plate member 30A (30B) and upper case 24 serves as heat resistance, and thus, the flow of heat from plate member 30A (30B) to upper case 24 is reduced. As a result, a local increase in temperature of upper case 24 caused by the high-temperature gas is suppressed, and a reduction in strength of upper case 24 caused by heat is suppressed.

Plate members 30A and 30B are attached to upper case 24 by several fixtures such as bolts. However, plate members 30A and 30B may be attached to upper case 24 by an adhesive having a low thermal conductivity, or a heat insulating material or the like may be interposed between plate members 30A, 30B and upper case 24. This also makes it possible to reduce the flow of heat from plate member 30A (30B) to upper case 24.

Plate members 30A and 30B each formed by a thin plate do not require a placement space, unlike the discharge duct described in Japanese Patent Laying-Open No. 2010-108788 above. Therefore, according to battery pack 1, it is possible to prevent upper case 24 from being damaged by the high-temperature gas discharged vigorously from opened discharge valve 14, while suppressing an increase in size of battery pack 1.

In the foregoing, each of plate members 30A and 30B is formed by a thin plate having a substantially rectangular cross-sectional shape along the Y-Z plane. However, as long as an increase in size of battery pack 1 is not caused, each of plate members 30A and 30B may be a thick plate, or a plate having a substantially square cross-sectional shape, an oval cross-sectional shape or the like. The plate member having such a shape can also prevent upper case 24 from being damaged by the gas discharged from opened discharge valve 14.

In the foregoing, plate members 30A and 30B extending in the stacking direction of cells 12 are provided along arrangement of discharge valves 14 in battery stacks 10A and 10B. However, the plate member may be separately provided for each discharge valve 14 of each cell 12. On the other hand, according to this first embodiment, plate members 30A and 30B are continuously formed with respect to discharge valves 14 of cells 12 forming battery stacks 10A and 10B, respectively, as described above. Therefore, the number of components can be reduced as compared with when the plate member is separately provided for each discharge valve 14.

In addition, according to this first embodiment, plate members 30A and 30B are attached to the case inner surface side of upper case 24. Therefore, plate members 30A and 30B can be easily placed between discharge valves 14 of cells 12 and case 20 (upper case 24).

In addition, in this first embodiment, upper case 24 is made of resin, and thus, the weight of battery pack 1 can be reduced. On the other hand, upper case 24 made of resin may be inferior in heat resistance to an upper case made of metal. According to battery pack 1, plate members 30A and 30B are provided between discharge valves 14 and upper case 24 made of resin. Therefore, upper case 24 made of resin can be protected against the high-temperature gas discharged from opened discharge valves 14.

Furthermore, according to this first embodiment, plate members 30A and 30B made of metal and extending in the stacking direction of cells 12 are fixed to the inner surface side of upper case 24 made of resin. Therefore, plate members 30A and 30B serve as reinforcing members for upper case 24, and thus, the strength of upper case 24 is also increased.

Second Embodiment

A second embodiment shows a configuration in which restraint bands configured to restrain battery stacks 10A and 10B in the stacking direction of cells 12 are also used as plate members provided between discharge valves 14 and upper case 24. This eliminates the need to separately provide plate members 30A and 30B described in the first embodiment, and thus, the number of components is reduced.

A configuration of a battery pack according to the second embodiment of the present disclosure will be described hereinafter with reference to FIGS. 6 to 8.

Figure 6:
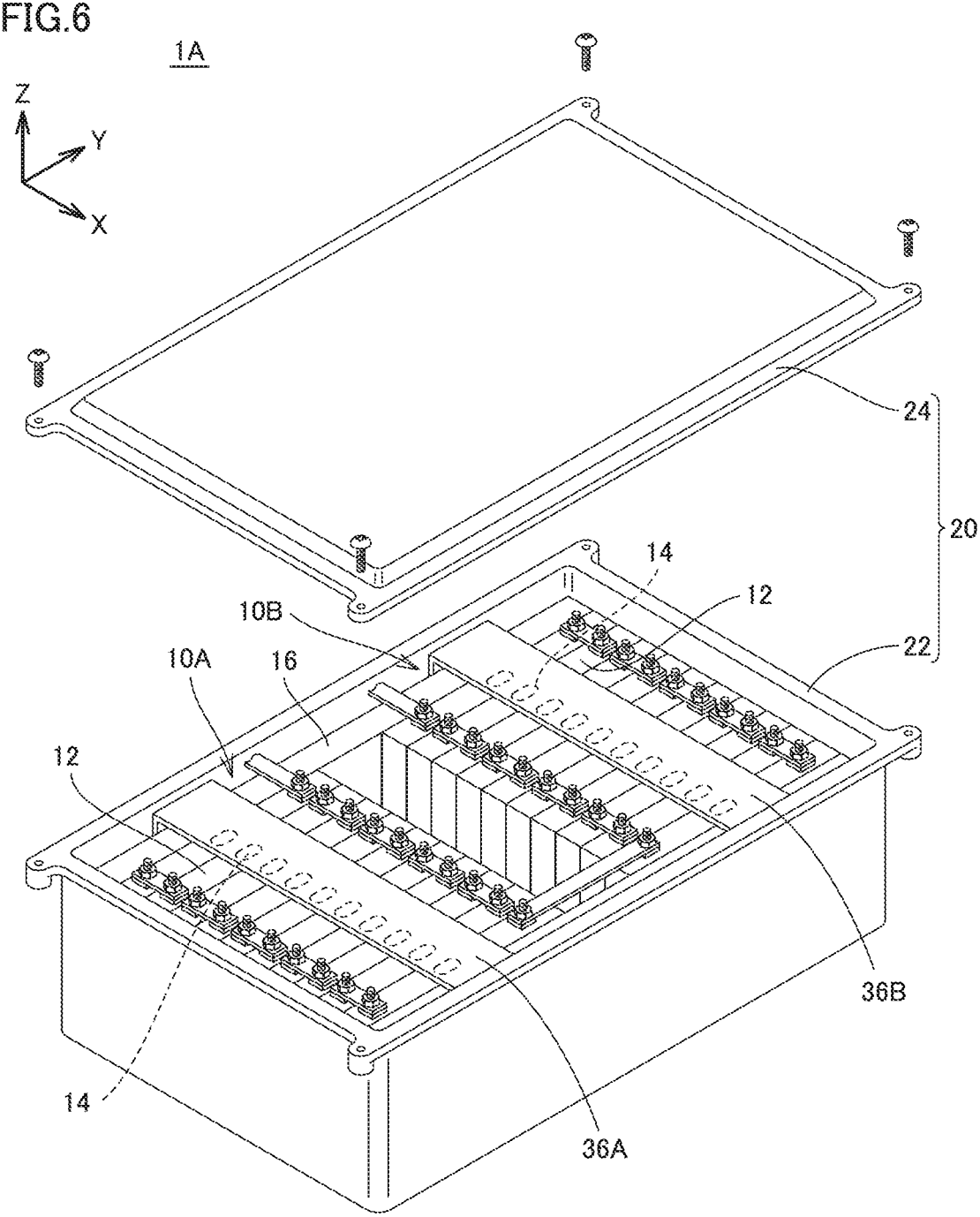
FIG. 6 is a perspective view of a battery pack according to a second embodiment.

FIG. 6 is a perspective view of the battery pack according to the second embodiment. Similarly to FIG. 1, FIG. 6 also shows the battery pack in a state where upper case 24 has been detached such that the inside (upper part) of the battery pack is visible.

Figure 7:
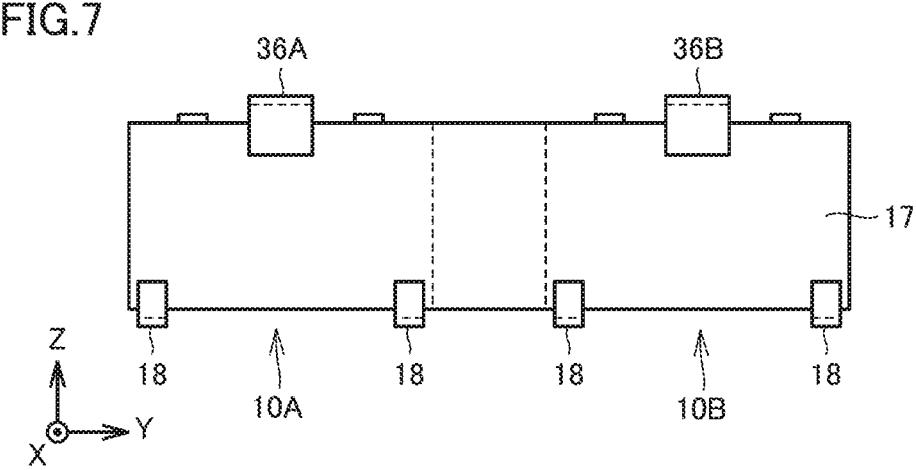
FIG. 7 is a side view of battery stacks shown in FIG. 6.

FIG. 7 is a side view of battery stacks 10A and 10B shown in FIG. 6. FIG. 7 shows a side surface when battery stacks 10A and 10B are viewed from the X direction.

Figure 8:
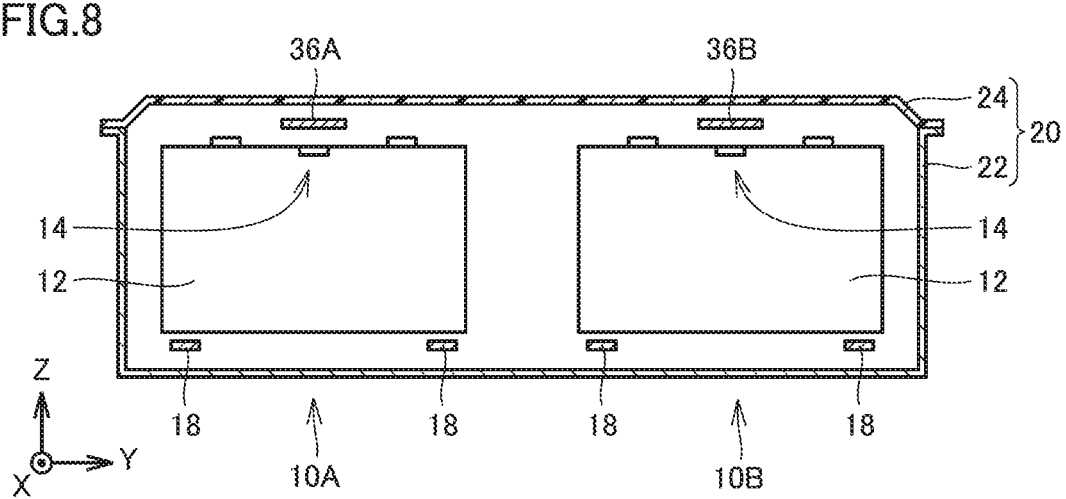
FIG. 8 is a cross-sectional view of the battery pack shown in FIG. 6.

FIG. 8 is a cross-sectional view of the battery pack shown in FIG. 6. FIG. 8 shows a cross section along the Y-Z plane. In addition, FIG. 8 shows a cross section in a state where upper case 24 has been attached.

Referring to FIGS. 6 to 8, a battery pack 1A is different from the configuration of battery pack 1 according to the first embodiment shown in FIGS. 1 to 3 in that battery pack 1A includes restraint bands 36A and 36B instead of plate members 30A and 30B and four restraint bands 18 provided on the upper surface side of battery stacks 10A and 10B.

Each of restraint bands 36A and 36B is made of metal, extends along the stacking direction (X direction) of cells 12, and connects end plates 16 and 17. Specifically, on the upper surface side of battery stack 10A, restraint band 36A is provided to be arranged above discharge valves 14 of cells 12 forming battery stack 10A, and on the upper surface side of battery stack 10B, restraint band 36B is provided to be arranged above discharge valves 14 of cells 12 forming battery stack 10B.

Restraint bands 36A and 36B are spaced apart from discharge valves 14 so as not to block discharge of the gas from opened discharge valves 14 (FIG. 8). When restraint bands 36A and 36B and battery stacks 10A and 10B are planarly viewed from above, restraint band 36A is arranged to overlap with discharge valves 14 of cells 12 forming battery stack 10A, and restraint band 36B is arranged to overlap with discharge valves 14 of cells 12 forming battery stack 10B.

Restraint bands 36A and 36B function as members for restraining battery stacks 10A and 10B in the stacking direction of cells 12, respectively, and also function as members for preventing the high-temperature gas discharged vigorously from opened discharge valves 14 from directly hitting upper case 24 when discharge valves 14 operate.

Therefore, according to this second embodiment, the effect similar to that of the first embodiment is obtained without separately providing plate members 30A and 30B described in the first embodiment. Since it is unnecessary to separately provide plate members 30A and 30B, the number of components can be reduced as compared with battery pack 1 according to the first embodiment.

Although discharge valve 14 of each cell 12 is provided at the center of the upper surface of the cell case in the above-described first and second embodiments, discharge valve 14 of each cell 12 may be provided at a position displaced in the longitudinal direction (Y direction) of cell 12 from the center of the upper surface of the cell case. In this case, the plate member or the restraint band functioning as the plate member is also arranged in accordance with the arrangement of discharge valve 14.

For example, when discharge valves 14 are arranged in a staggered manner in the stacking direction of cells 12 as shown in FIG. 9 corresponding to the plan view shown in FIG. 3, plate members 30A-1 and 30A-2 may be provided instead of plate member 30A in the first embodiment, and plate members 30B-1 and 30B-2 may be provided instead of plate member 30B. Here, plate members 30A-1 and 30A-2 are arranged to overlap with discharge valves 14 of cells 12 forming battery stack 10A, and plate members 30B-1 and 30B-2 are arranged to overlap with discharge valves 14 of cells 12 forming battery stack 10B. Alternatively, restraint bands 36A-1, 36A-2, 36B-1, and 36B-2 may be provided instead of plate members 30A-1, 30A-2, 30B-1, and 30B-2.

In addition, in the foregoing, plate members 30A and 30B (30A-1, 30A-2, 30B-1, and 30B-2) are attached to upper case 24. However, these plate members may be attached to lower case 22. For example, the ends of plate members 30A and 30B (30A-1, 30A-2, 30B-1, and 30B-2) may be fixed to the peripheral wall portion of lower case 22 such that plate members 30A and 30B (30A-1, 30A-2, 30B-1, and 30B-2) extend in the stacking direction of cells 12 and span the peripheral wall portion of lower case 22.

While the embodiments of the present disclosure have been described above, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A battery pack comprising:
at least one battery including a discharge valve configured to discharge gas in the inside to the outside when an internal pressure increases;
a case configured to house the battery; and
a plate member provided between the discharge valve and the case,
the plate member being arranged to overlap with the discharge valve when the battery and the plate member are planarly viewed from a direction normal to a first surface of the battery provided with the discharge valve, wherein
the at least one battery includes a plurality of batteries,
the plurality of batteries are provided and stacked to form a battery stack,
the plurality of batteries are stacked such that each of the plurality of batteries is provided with the discharge valve on the first surface of the battery stack,
the plate member is made of metal and is fixed to a second surface of the case by a fixture or an adhesive with a heat insulating material interposed between the plate member and the second surface of the case that houses the battery, wherein the second surface faces the first surface of the battery, and
a gap is formed by unevenness of a contact surface between the plate member and the case.

2. The battery pack according to claim 1, wherein
the plate member extends in a stacking direction of the plurality of batteries and is continuously formed with respect to the discharge valve of each of the plurality of batteries.

3. The battery pack according to 1, wherein
the case includes:
a lower case in which the battery is disposed; and
an upper case provided above the lower case,
the plate member is provided between the discharge valve and the upper case, and
the upper case is made of resin.

4. The battery pack according to 2, wherein
the case includes:
a lower case in which the battery is disposed; and
an upper case provided above the lower case,
the plate member is provided between the discharge valve and the upper case, and
the upper case is made of resin.

5. The battery pack according to 1, wherein,
the discharge valve includes a first row of discharge valves and a second row of discharge valves,
the plurality of batteries are arranged in a direction orthogonal to the stacking direction to form the first row of discharge valves and the second row of discharge valves, and
the plate member includes a first plate disposed at a position overlapping with the first row of discharge valves and a second plate disposed at a position overlapping with the second row of discharge valves.

* * * * *